United States Patent
Hoffman

[15] 3,666,674
[45] May 30, 1972

[54] URANYL-ACTIVATED STRONTIUM ZINC PYROPHOSPHATE PHOSPHORS

[72] Inventor: Mary V. Hoffman, South Euclid, Ohio
[73] Assignee: General Electric Company
[22] Filed: Feb. 24, 1969
[21] Appl. No.: 805,972

Related U.S. Application Data

[63] Continuation-in-part of Ser. No. 710,391, Mar. 4, 1968, abandoned.

[52] U.S. Cl. ..................................252/301.1 R, 250/106 R
[51] Int. Cl. ............................................................C09k 1/36
[58] Field of Search ......................25/301.1, 301.2; 264/0.5; 250/71, 106

[56] References Cited

UNITED STATES PATENTS 3,457,179  7/1969  Natansohn..........................252/301.1

OTHER PUBLICATIONS

Lei, Tsai– Teh et al., Polarographic Study of Uranyl-Pyrophosphate Complex in the Presence of Various Surface-Active Substances, Talanta, 1965, Vol. 12, pp. 269– 276.

Primary Examiner—Carl D. Quarforth
Assistant Examiner—P. A. Nelson
Attorney—John F. McDevitt, Henry P. Truesdell, Frank L. Neuhauser, Oscar B. Waddell and Joseph B. Forman

[57] ABSTRACT

Uranyl-activated strontium zinc pyrophosphate, with allowable substitution of minor amounts of barium for strontium and cadmium for zinc, efficiently produces green light having sharp emission peaks particularly suitable for reprographic work in monochrome copying of materials of various colors. Also, rare earth ions such as $Eu^{+3}$ can be substituted for small amounts of strontium, preferably using $K^{+1}$ for charge compensation. This adds red peaks to the emission.

6 Claims, 2 Drawing Figures

EMISSION SPECTRA OF
$SrZnP_2O_7 : U$ &
$Zn_2 SiO_4 : Mn$

EMISSION SPECTRA OF
$SrZnP_2O_7:U$ &
$Zn_2SiO_4:Mn$

Inventor:
Mary V. Hoffman
by Richard H. Burgess
Her Attorney

URANYL-ACTIVATED STRONTIUM ZINC PYROPHOSPHATE PHOSPHORS

CROSS-REFERENCES TO RELATED APPLICATIONS

This application is a continuation-in-part of applicant's application Ser. No. 710,391, filed Mar. 4, 1968, now abandoned.

BACKGROUND OF THE INVENTION

This invention relates to inorganic crystalline luminescent materials. More particularly, it relates to strontium zinc pyrophosphate luminescent materials.

In many inorganic crystalline luminescent materials, the spectral characteristics of the light produced, including the color, are similar for certain activator ions, somewhat independent of the matrix. However, in other luminescent materials, the spectral characteristics of the light produced by these same activators depends on the matrix or on the processing given to the phosphor. Also the matrix-activator combination can have a very significant effect on brightness and other characteristics of light output, which, in turn, can have a controlling effect on the commercial utility of the luminescent material or phosphor.

Many types of phosphate matrix systems have been investigated for use as luminescent materials. Binary orthophosphates and pyrophosphates of calcium, strontium, barium, cadmium and other elements with certain activators are commercially useful as phosphors. Also, the uranyl ion, $UO_2^{+2}$, has been investigated in various matrix systems, both organic and inorganic, and often containing water. However, organic and water-containing systems generally are of limited commercial utility in lamp applications, because of their instability during normal lamp-making processes. No lamp or electronic phosphors of commercial importance are known in which the uranyl ion is present as an activator.

In general, activation with uranium appears to be of at least two types: that of $U^{+6}$, and that of the uranyl ion, $UO_2^{+2}$, in which the uranium also has a formal valence of $U^{+6}$. The first type is to be expected in compounds such as the tungstate, in which a direct substitution of $U^{+6}$ for $W^{+6}$ is possible. This emission can be green and can contain broad, overlapping lines, but the fluorescence and the absorption spectra differ considerably from that found in the uranyl ion.

The spectra of the uranyl ion have been studied in considerable detail and can be identified by the consistent number of lines found at repeating wavelength intervals, in both the absorption and the fluorescence spectra. The position and relative intensity of these lines are similar for all uranyl compounds, but the absolute intensity is quite dependent on the matrix. In general, $UO_2^{+2}$ fluorescence has been found in matrices in which the uranyl ion is a major component, and which also contain $H_2O$ molecules, for example, $Ca(UO_2)_2(PO_4)_2 \cdot XH_2O$, the mineral autunite. It is also found in solutions, in which the $UO_2^{+2}$ molecule retains its identity.

Among the early work on uranium activation in solids is that of M. K. Slattery (J. Optical Soc. of America, 19, 175, 1929). She examined a large number of compositions with uranium as an activator and found fluorescence in about a third of them. The results showed the phosphates of cadmium, strontium and barium, each alone, to be "inert," and of zinc, fluorescent only with "large amounts of $UO_3$." It is not possible from this work to determine the compounds examined, the relative brightness found, or to determine if the fluorescence was due to $UO_2^{+2}$ or to $U^{+6}$. Thus, the nature of the emission cannot be determined, and phosphors generally useful in lamps were not taught by Slattery.

SUMMARY OF THE INVENTION

The present invention in certain of its embodiments provides as a luminescent material the crystalline compound strontium zinc pyrophosphate activated by the uranyl ion. This compound persists structurally with partial substitutions of barium for strontium and cadmium for zinc, without materially decreasing the brightness of the material. Also, the compound accepts rare earth and alkali additions. Certain preferred embodiments of the invention provide a luminescent material wherein the constituents are present in approximate molar amounts, measured as the oxides, of $A-(e+f)$ AO : $b$ EO : $c$ $P_2O_7$ : $d$ $UO_2$ : $e/2$ $Ln_2O_3$ : $f/2$ $R_2O$ wherein A is $(Sr_{1-x}Ba_x)$ with $x$ from 0 to 0.4,
E is $(Zn_{1-y}Cd_y)$ with $y$ from 0 to 0.3,
Ln is at least one of Eu, Pr, Nd and Sm,
R is at least one of Na, Li, K and Rb,
$a$ is from 0.95 to 1.05,
$b$ is from 0.95 to 1.05,
$c$ is from 0.98 to 1.02,
$d$ is from 0.02 to 0.12,
$e$ is from 0 to 0.020, and
$f$ is from 0 to 0.020.

When Ln is used, $e$ is preferably at least 0.0001.

A preferred embodiment of the invention for maximum $UO_2^{+2}$ emission provides such a luminescent material in which $x$ is from 0.15 to 0.25,
$y$ is from 0.10 to 0.15,
$a$ is approximately 1.0,
$b$ is approximately 1.0,
$c$ is approximately 1.0,
$d$ is from 0.04 to 0.08, and
$e$ and $f$ are 0.

In a preferred embodiment in which the visible sensitized emission of the rare earth is desired Ln is Eu
R is K
$e$ is from 0.0010 to 0.010, and
$f$ is from 0.0010 to 0.010.

One optimum embodiment of the invention provides such a luminescent material in which $x$ is approximately 0.2,
$y$ is approximately 0,
$a$ is approximately 1.0,
$b$ is approximately 1.0,
$c$ is approximately 1.0, and
$d$ is approximately 0.06.

Since the exact situation of the $UO_2^{+2}$ ion is not known, the phosphor will be referred to herein by the conventional type of phosphor formula, for example: $SrZnP_2O_7$:$UO_2^{+2}$ However, the $UO_2^{+2}$ content of phosphors of the invention in solid solution in the matrix of the compound.

The optimum embodiment in which the rare earth emission is required would depend on the desired ratio of the green $UO_2^{+2}$ emission to the red $Eu^{+3}$ emission. The most intense $Eu^{+3}$ emission is obtained with value of $e$ and $f$ approximately 0.004. For optimum charge compensation and maximum $Eu^{+3}$ emission, $e$ and $f$ should have the same values, however, the invention is also operative when $e$ and $f$ are not the same and even without charge compensation.

DESCRIPTION OF THE PREFERRED EMBODIMENTS

Figure 1:
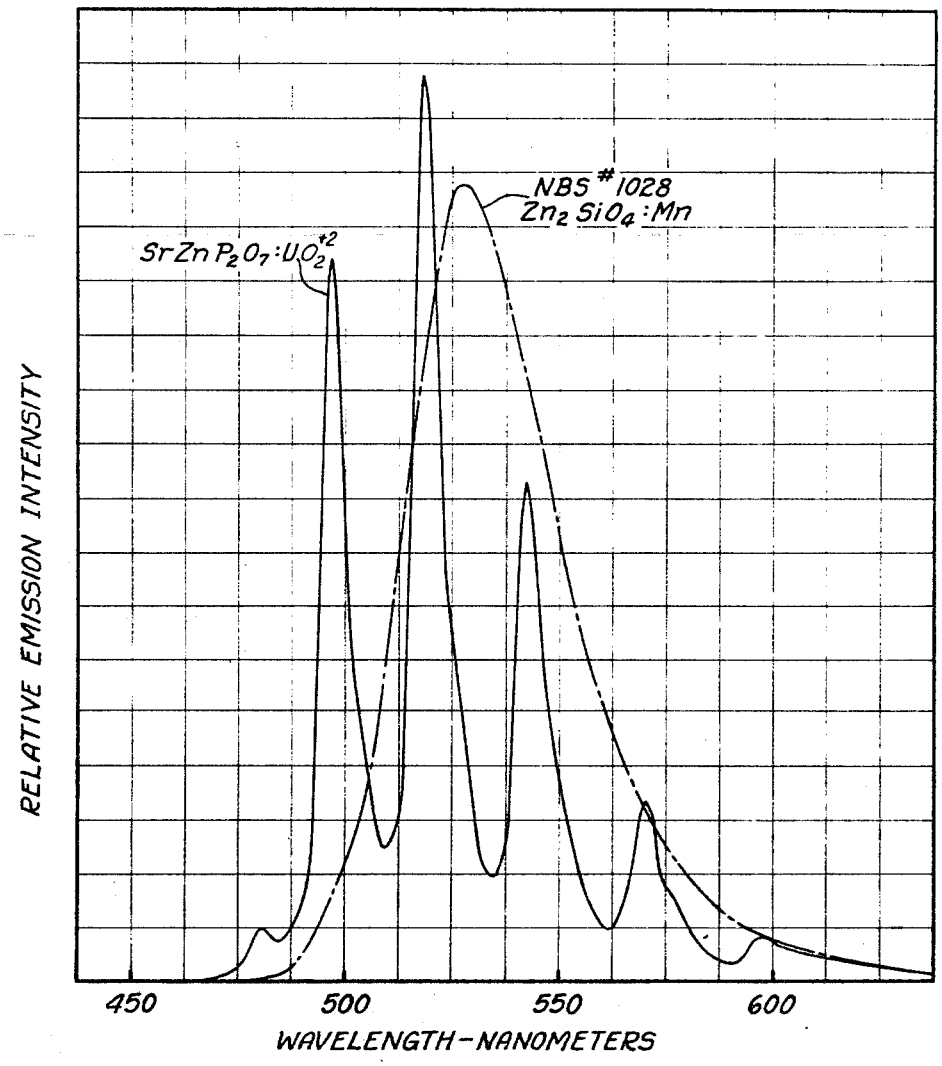
FIG. 1 is a graphical representation of the spectral distribution of light produced by $SrZnP_2O_7$:$UO_2^{+2}$ phosphor when excited by 2,537 angstrom unit (A) radiation, compared with that of National Bureau of Standards standard phosphor (NBS) No. 1028 $Zn_2SiO_4$:Mn.

Work of the present invention has shown that the crystalline compound $SrZnP_2O_7$, which is distinct and different from its end members $Sr_2P_2O_7$ and $Zn_2P_2O_7$, will accept the $UO_2^{+2}$ ion into its structure and fluoresce under ultraviolet light in the green region with the line emission typical of the uranyl ion. FIG. 1 shows this emission and by comparison shows that the absolute peak height of the two major lines is substantially higher than the height of NBS No. 1028 $Zn_2SiO_4$:Mn at the same wavelengths. For applications where high intensity like emission is required, such as for improved reprography of materials of various colors, this emission of the material of the present invention is particularly useful and is superior to the NBS phosphor. Since materials cannot be copied well if the color of the illuminating light is the same as a principal color of the material being copied, it is desirable to use light with one or more sharp emission peaks. Also, use of such sharp peaks avoids the indistinct results that can be obtained with broad-band illumination.

Figure 2:
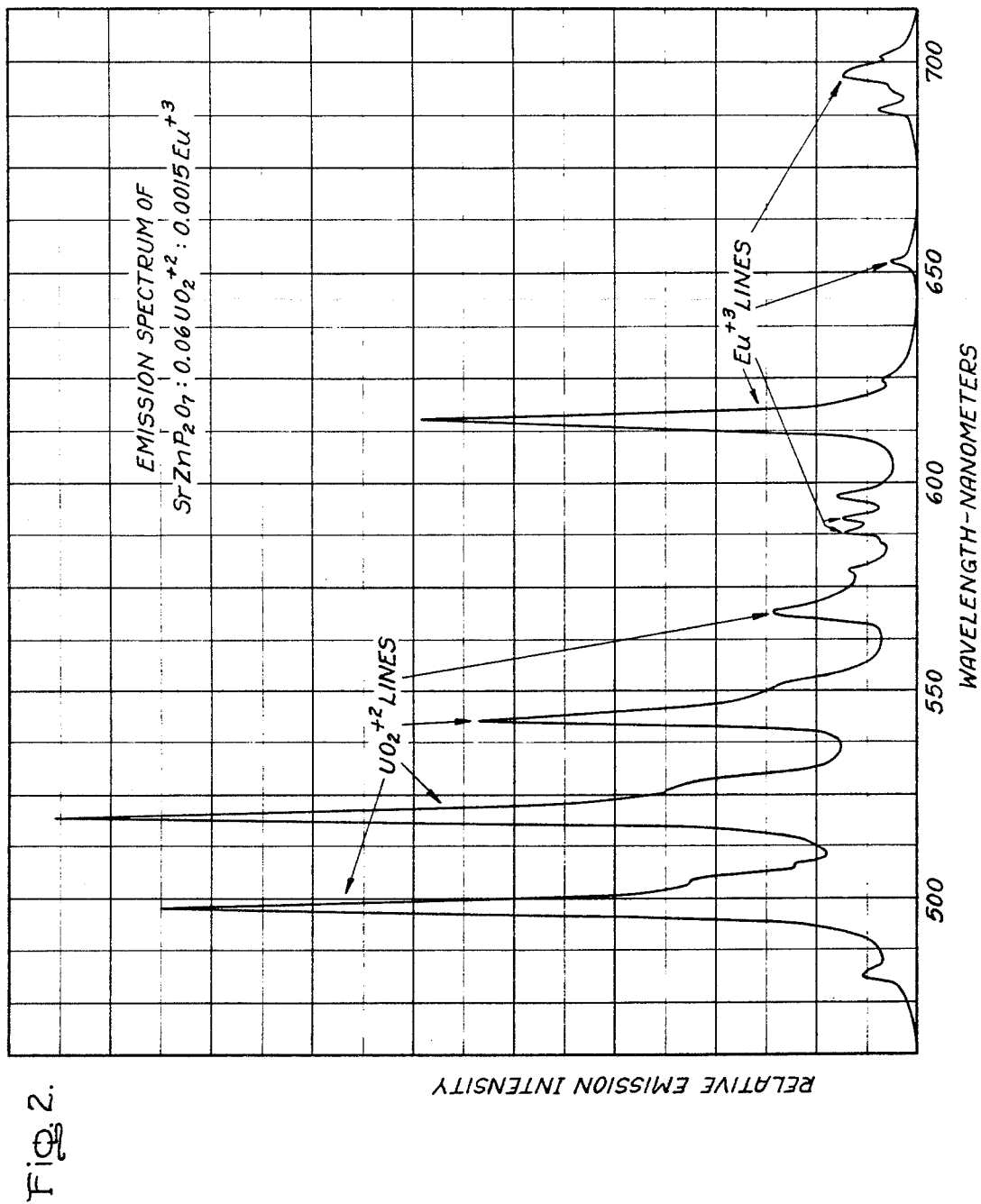
FIG. 2 is a similar drawing showing the emission spectrum of $SrZnP_2O_7$:$0.06UO_2^{+2}$:$0.0015Eu^{+2}$ with $UO_2^{+2}$ and $Eu^{+3}$ emission peak lines identified.

A typical spectrum of phosphor of the invention containing $Eu^{+3}$, shown in FIG. 2, is suitable for various purposes, having a more balanced whiter emission while still retaining the advantages gained from sharp emission lines.

The broad numerical composition limits stated in the Summary above are those which will produce luminescent materials having at least two-thirds of the maximum brightness for the stoichiometric $SrZnP_2O_7$:$UO_2^{+2}$. The maximum brightness is obtained when the values of $a$, $b$, and $c$ are as close to 1.0 as possible, and the value of $d$ is between about 0.04 and 0.08. Up to 40 mole percent Ba can be substituted for Sr before the brightness is decreased, and with 15 to 20 mole percent substitution, the brightness is increased. Up to 30 mole percent Cd can be substituted for Zn with no decrease in brightness, and with 10 to 15 mole percent substitution, the brightness is increased. Both Ba and Cd can be substituted for Sr and Zn at the same time, and the brightness increase is retained.

Other partial substitutions, such as Ca for Sr, Cd for Sr, and Mg for Zn, are possible in this matrix, but all of these result in a decrease in brightness. Such substitutions in small amounts, and other substitutions, which do not cause material decreases in brightness are within the scope of the present invention, although larger quantities of these and other impurities which do cause material decreases in brightness are not within the scope of the invention.

The incorporation of the $Ln^{+3}$ rare earths Eu, Nd, Pr or Sm results in the sensitization and enhancement of the characteristic emission of the rare earth by the uranyl ion; Sm and Pr in the yellow-orange region, $Eu^{+3}$ in the red and Nd in the infrared. Of these, the $Eu^{+3}$ has the highest intensity. The enhancement of the rare earth emission is a result of transfer of energy within the phosphor crystal from the $UO_2^{+2}$ to the rare earth. The green emission from $UO_2^{+2}$ is diminished by this transfer. Without the presence of $UO_2^{+2}$, the rare earth essentially has no emission in this matrix.

When Ln is Eu, R is preferably K.

The purpose of the incorporation of the $R^{+1}$ alkali cation Na, Li, K or Rb is to provide charge compensation for the $Ln^{+3}$ incorporation. Both cations substitute for $Sr^{+2}$ according to the formula $$2Sr^{+2} = Ln^{+3} + R^{+1}.$$

By this means, the $Ln^{+3}$ emission is increased and the $UO_2^{+2}$ emission is decreased over that obtained when no alkali cation is incorporated.

The starting material which can be used are any source of Sr, Ba, Cd or Zn which can be fired to the oxide or to a phosphate, such as $SrCO_3$, $SrHPO_4$, ZnO, $ZnNH_4PO_4$, $Zn_3(PO_4)_2 \cdot 2H_2O$, $BaCO_3$, $BaHPO_4$, $CdCO_3$, $CdNH_4PO_4$. With some formulations, a source of $P_2O_5$, such as $(NH_4)_2HPO_4$, is also required. The $UO_2^{+2}$ activator ion can be supplied from any uranyl compound, such as uranyl acetate, $UO_2(C_2H_2O_2)_2 \cdot 2H_2O$. Alternatively, the starting materials can include a coprecipitate of zinc uranyl ammonium phosphate as described in Example 6 below.

The appropriate starting materials are mixed together and then fired at a temperature between 600° and 900° C. for several hours. They are then milled and fired again at 800° to 950°C. for several hours. An additional milling and firing may be necessary to obtain the maximum brightness.

EXAMPLE 1

| Moles | Material | Grams |
|---|---|---|
| 1.00 | $SrHPO_4$ | 183.6 |
| 1.00 | $ZnNH_4PO_4$ | 178.3 |
| 0.06 | $UO_2(C_2H_2O_2)_2 \cdot 2H_2O$ | 25.3 |

These materials are ball milled in acetone, dried and then screened through 100 mesh. These were then fired at 900° C. for 3 hours, ball milled again and refired at 900° C. for 16 hours. All the firings were in a quartz or silica tray, in an air atmosphere. After the final firing, the phosphor is ground lightly and screened.

EXAMPLE 2

| Moles | Material | Grams |
|---|---|---|
| 1.00 | $SrHPO_4$ | 183.6 |
| 1.00 | ZnO | 81.4 |
| 1.00 | $(NH_4)_2HPO_4$ | 132.2 |
| 0.06 | $UO_2(C_2H_2O_2)_2 \cdot 2H_2O$ | 25.3 |

These materials were blended together and fired at 600° C. for 2 hours. They were then ballmilled and refired at 900° C. for 16 hours. After firing, the material is ground lightly and screened.

EXAMPLE 3

| Moles | Material | Grams |
|---|---|---|
| 0.80 | $SrHPO_4$ | 146.5 |
| 0.20 | $BaHPO_4$ | 46.5 |
| 1.00 | $ZnNH_4PO_4$ | 178.3 |
| 0.06 | $UO_2(C_2H_2O_2)_2 \cdot 2H_2O$ | 25.3 |

EXAMPLE 4

| Moles | Material | Grams |
|---|---|---|
| 1.00 | $SrHPO_7$ | 183.6 |
| 0.90 | $ZnNH_4PO_7$ | 160.5 |
| 0.10 | $CdNH_4PO_7$ | 22.5 |
| 0.06 | $UO_2(C_2H_2O_2)_2 \cdot 2H_2O$ | 25.3 |

EXAMPLE 5

| Moles | Material | Grams |
|---|---|---|
| 0.80 | $SrHPO_4$ | 146.5 |
| 0.20 | $BaHPO_4$ | 46.5 |
| 0.90 | $ZnNH_4PO_4$ | 160.5 |
| 0.10 | $CdNH_4PO_7$ | 22.5 |
| 0.06 | $UO_2(C_2H_2O_2)_2 \cdot 2H_2O$ | 25.3 |

To provide as a starting material the coprecipitate of the $UO_2^{+2}$ activator ion in the $ZnNH_4PO_4$ compound, $NH_4OH$ is added to an acid solution containing the proper molar proportions of $Zn^{+2}$, $UO_2^{+2}$ and a slight excess of $PO_4^{-3}$ ions. The exact composition or structure of the precipitate is not known, but for the purpose of formula calculations it is assumed to be $Zn_{1-d}(UO_2)_dNH_4PO_4$. When this procedure is used, $d$ can be up to at least 0.12, whatever activator content is desired in the finished phosphor. An amount of ZnO equal to $d$ must be used to maintain stoichiometry.

EXAMPLE 6

| Moles | Material | Grams |
|---|---|---|
| 1.00 |  $Zn_{0.94}(UO_2)_{0.06}NH_4PO_4$ | 190.7 |

| Moles | Material | Grams |
|---|---|---|
| 0.06 | ZnO | 4.88 |
| 1.00 | SrHPO$_4$ | 183.6 |

This coprecipitation method has the advantage of dispersing the activator more thoroughly and of course can be used with dry mixing. Because of the more uniform distribution of the activator in the phosphor crystals, brightness increases of 10 percent to 15 percent can be obtained by using this procedure. The incorporation of Ba and Cd as shown in Examples 3, 4 and 5 are also possible when the coprecipitated procedure is used.

Examples 3, 4, 5 and 6 are mixed either dry or in acetone and fired as Example 1.

The brightness of this phosphor was measured by comparing the intensity of the SrZnP$_2$O$_7$ : U peak at 522 nanometers (nm) with the peak at 523 nm of the NBS phosphor.

Phosphors prepared by Examples 1 and 2 have 100 to 110 percent of the peak intensity of the NBS phosphor. Phosphors prepared by Example 3 have 140 percent of that peak intensity. Those prepared by Examples 4 and 5 have about 130percent of that peak intensity. The position and the relative intensities of the UO$_2^{+2}$ emission peaks are not changed by the substitutions shown in Examples 3, 4 and 5.

EXAMPLE 7

As an example of the incorporation of the preferred rare earth and alkali, the following could be used:

| Moles | Material | Grams |
|---|---|---|
| 1.00 | Zn$_{0.94}$(UO$_2$)$_{0.06}$NH$_4$PO$_4$ | 190.7 |
| 0.06 | ZnO | 4.88 |
| 1.0 | SrHPO$_4$ | 183.6 |
| 0.002 | Eu$_2$O$_3$ | 0.704 |
| 0.002 | K$_2$CO$_3$ | 0.276 |

The phosphor can be mixed and fired as in the previous example using the coprecipitated material. While the Eu and K actually substitute for Sr in the crystal structure, the amount incorporated is too small to make a formula change either necessary or practical.

The effect on the emission of UO$_2^{+2}$ as measured by the 522 nm emission line and the Eu$^{+3}$ emission at 613 nm is shown in Table I for three Eu$^{+3}$ concentrations, prepared with and without the K$^{+1}$ charge compensations.

TABLE I

Effects of Eu$^{+3}$ and UO$_2^{+2}$ Contents on Emission

| Composition | | | | Emission, peak intensity (nm) | |
|---|---|---|---|---|---|
| $d$ (UO$_2^{(K+2)}$) | $e$ (Eu$^{+3}$) | $f$ (K$^{+1}$) | | 522 (UO$_2^{+2}$) | 613 (Eu$^{+3}$) |
| 0 | 0.01 | 0.01 | | 0 | 0.5 |
| 0.06 | 0 | 0 | | 110 | 0 |
| 0.06 | 0.0015 | 0 | | 86 | 49 |
| 0.06 | 0.0040 | 0 | | 67 | 79 |
| 0.06 | 0.0100 | 0 | | 56 | 61 |
| 0.06 | 0.0015 | 0.0015 | | 76 | 89 |
| 0.06 | 0.0040 | 0.0040 | | 55 | 120 |
| 0.06 | 0.0100 | 0.0100 | | 38 | 110 |

The foregoing is a description of illustrative embodiments of the invention which constitute substantial improvements over the prior art.

What I claim as new and desire to secure by Letters Patent of the United States is:

1. As a luminescent material, phosphor crystals of strontium zinc pyrophosphate activated by the uranyl ion which is dispersed in the matrix of said phosphor crystals.

2. A luminescent material according to claim 1 wherein the constituents are present in approximate molar amounts, measured as the oxides, of $a-(e+f)$ AO : $b$ EO : $c$ P$_2$O$_7$ : $d$ UO$_2$ : $e/2$ Ln$_2$O$_3$ : $f/2$ R$_2$O wherein A is (Sr$_{1-x}$Ba$_x$) with $x$ from 0 to 0.4,
E is (Zn$_{1-y}$Cd$_y$) with $y$ from 0 to 0.3,
Ln is at least one of Eu, Pr, Nd and Sm,
R is at least one of Na, Li, K and Rb,
$a$ is from 0.95 to 1.05,
$b$ is from 0.95 to 1.05,
$c$ is from 0.98 to 1.02,
$d$ is from 0.02 to 0.12,
$e$ is from 0 to 0.020, and
$f$ is from 0 to 0.020.

3. A luminescent material according to claim 2 in which
$x$ is from 0.15 to 0.25,
$y$ is from 0.10 to 0.15,
$a$ is approximately 1.0,
$b$ is approximately 1.0,
$c$ is approximately 1.0, and
$d$ is from 0.04 to 0.08

4. A luminescent material according to claim 2 in which
$e$ is from 0.0010 to 0.010, and
$f$ is from 0.0010 to 0.010.

5. A luminescent material according to claim 2 in which
$x$ is approximately 0.2,
$y$ is approximately 0,
$a$ is approximately 1.0,
$b$ is approximately 1.0,
$c$ is approximately 1.0, and
$d$ is approximately 0.06.

6. A luminescent material according to claim 2 in which $e$ and $f$ are each approximately 0.004.

* * * * *